(12) United States Patent
Huang

(10) Patent No.: US 10,173,512 B1
(45) Date of Patent: Jan. 8, 2019

(54) BATTERY MOUNTING DEVICE FOR AN ELECTRIC ALL TERRAIN VEHICLE OR AN ELECTRIC UTILITY VEHICLE

(71) Applicant: Chien-Hsiang Huang, Tai-Pao (TW)

(72) Inventor: Chien-Hsiang Huang, Tai-Pao (TW)

( * ) Notice: Subject to any disclaimer, the term of this patent is extended or adjusted under 35 U.S.C. 154(b) by 0 days.

(21) Appl. No.: 16/045,804

(22) Filed: Jul. 26, 2018

(51) Int. Cl.
*B60K 1/04* (2006.01)
*B60L 11/18* (2006.01)

(52) U.S. Cl.
CPC ............ *B60K 1/04* (2013.01); *B60L 11/1877* (2013.01); *B60K 2001/0422* (2013.01)

(58) Field of Classification Search
CPC ... B60K 1/04; B60K 1/00; B60K 1/06; B60K 1/08; B60K 1/02; H01M 2/1083; B60S 5/06
See application file for complete search history.

(56) References Cited

U.S. PATENT DOCUMENTS

| | | | | |
|---|---|---|---|---|
| 5,207,288 A * | 5/1993 | Ono | ....................... | B62K 11/00 180/220 |
| 5,421,427 A * | 6/1995 | Ogawa | ................ | B60L 11/1805 180/220 |
| 6,547,027 B1 * | 4/2003 | Kalhok | ....................... | B62J 1/12 180/210 |
| 7,104,557 B2 * | 9/2006 | Chen | ....................... | B62K 3/002 180/65.1 |
| 7,117,966 B2 * | 10/2006 | Kohda | ..................... | B60K 1/04 180/68.5 |
| 2009/0255747 A1 * | 10/2009 | Kasaba | .................. | B62D 51/02 180/208 |

* cited by examiner

*Primary Examiner* — James A Shriver, II
*Assistant Examiner* — James J Triggs
(74) *Attorney, Agent, or Firm* — Alan D. Kamrath; Kamrath IP Lawfirm, P.A.

(57) ABSTRACT

A battery mounting device includes a body having a frame with a connecting portion. The connecting portion includes at least one positioning portion. An elevating seat is mounted to the frame and is movable between a mounting position and a replacement position lower than the mounting position. The elevating seat includes at least one positioning member disengageably coupled to the at least one positioning portion. An actuation device is mounted to the frame and is operable to move the elevating seat in the vertical direction. A battery seat is detachably mounted to the elevating seat and includes a lower positioning portion coupled with a lower positioning member of the elevating seat in the mounting position. When the elevating seat is in the replacement position, the battery seat is placed on the ground, and the lower positioning portion is disengaged from the lower positioning member.

10 Claims, 6 Drawing Sheets

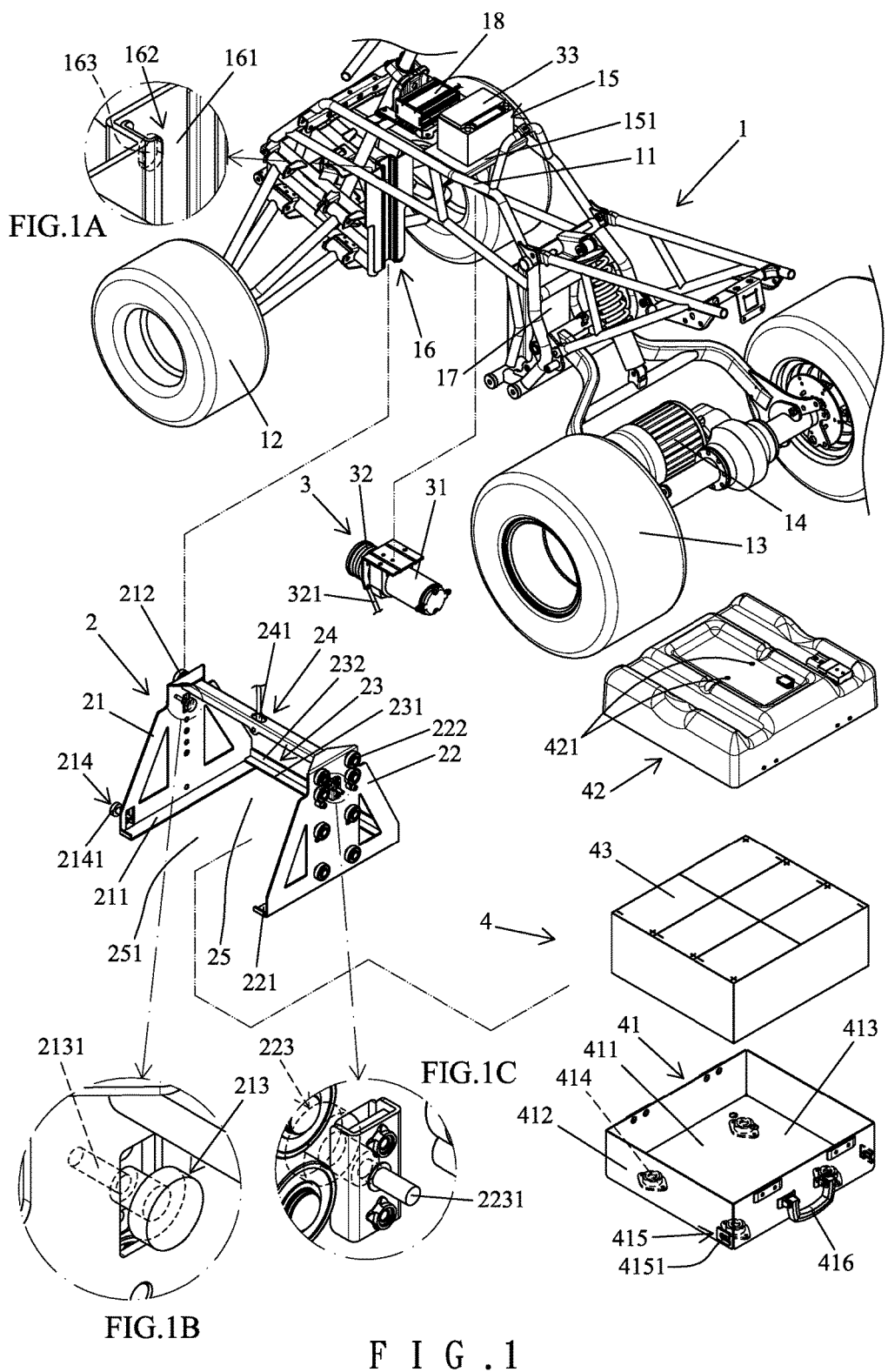
F I G . 1

BATTERY MOUNTING DEVICE FOR AN ELECTRIC ALL TERRAIN VEHICLE OR AN ELECTRIC UTILITY VEHICLE

BACKGROUND OF THE INVENTION

The present invention relates to a battery mounting device for an electric all terrain vehicle or an electric utility vehicle and, more particularly, to a battery mounting device providing easier replacement and improved mounting stability.

In view of the serious problems of global warming and air pollution, energy saving and reduction of carbon emission are important issues in many countries. Thus, electric vehicles free of internal combustions do not directly discharge waste gases and are, thus, the current design trend of vehicles.

An electric vehicle includes a motor as a driving source. The electric vehicle must include one or more batteries according to the size of the electric vehicle to enable the motor to operate a predetermined period of time. Batteries having insufficient electricity must be recharged to permit the motor to operate again.

However, charging batteries requires several hours during which the electric vehicle cannot move. Current two-wheeled vehicles permit direct replacement of charged batteries, such that electricity can be directly supplied to the motor for operation. A two-wheeled vehicle has a small volume and, thus, only requires replacement of fewer batteries to supply a motor with sufficient electricity. A vehicle having a larger volume has more batteries which are heavier and which are not easy to be rapidly replaced by a user or a repairman.

BRIEF SUMMARY OF THE INVENTION

An objective of the present invention is to provide a battery mounting device providing easier replacement and improved mounting stability.

A battery mounting device for an electric all terrain vehicle or an electric utility vehicle according to the present invention includes a body including a frame having a connecting portion. The connecting portion includes a front guiding board at a front end thereof and a rear guiding board at a rear end thereof. Each of the front guiding board and the rear guiding board extends in a vertical direction perpendicular to a ground. At least one of the front guiding board and the rear guiding board includes a positioning portion. An elevating seat is mounted to the connecting portion of the frame. The elevating seat is movable in the vertical direction between a mounting position and a replacement position lower than the mounting position. The elevating seat includes a front board and a rear board spaced from the front board. Each of the front board and the rear board extends perpendicularly to the ground. Each of the front board and the rear board is movable relative to the front and rear guiding boards in the vertical direction. The elevating seat includes at least one positioning member disengageably coupled to the positioning portion. The elevating seat further includes a lower positioning member. An actuation device is mounted to the frame. The actuation device is operable to move the elevating seat in the vertical direction. A battery seat is detachably mounted to the elevating seat. The battery seat includes a battery and a compartment receiving the battery. A plurality of wheels is mounted to a bottom side of the battery seat. The battery seat further includes a lower positioning portion detachably coupled to the lower positioning member. The lower positioning portion is coupled with the lower positioning member when the elevating seat is in the mounting position. When the elevating seat is in the replacement position, the battery seat is adapted to be placed on the ground, and the lower positioning portion is disengaged from the lower positioning member.

In an example, the connecting portion is located in a central portion of the frame. The front guiding board includes a rear side having a front guiding groove extending in the vertical direction. The rear guiding board includes a front side having a rear guiding groove extending in the vertical direction. A front guiding wheel is mounted to a front side of the front board and is movable in the front guiding groove. A rear guiding wheel is mounted to a rear side of the rear board and is movable in the rear guiding groove.

In an example, the elevating seat includes a side connecting rod extending parallel to the ground and interconnected between a side of the front board and a side of the rear board. The elevating seat further includes an upper connecting rod interconnected between the front board and the rear board and extending parallel to and above the side connecting rod. The front board, the rear board, the side connecting rod, and the upper connecting rod together define a receiving space. The receiving portion includes an opening facing the side connecting rod. The front board includes a front mounting board extending from a lower end thereof towards the receiving space. The rear board includes a rear mounting board extending from a lower end thereof towards the receiving space. The side connecting rod includes a side mounting board extending from a lower end thereof towards the receiving space. The battery seat is supported by the front mounting board, the rear mounting board, and the side mounting board.

In an example, the side connecting rod includes a back board extending vertically from the side mounting board, and the back board abuts the battery seat.

In an example, the front guiding board includes a front positioning portion having a front positioning hole. The rear guiding board includes a rear guiding portion having a rear positioning hole. The front board includes a front positioning member having a front positioning button. The rear board includes a rear positioning member having a rear positioning button. The front positioning button extends through the front positioning hole and the rear positioning button extends through the rear positioning hole to position the elevating seat in the mounting position.

In an example, the elevating seat includes an upper connecting rod interconnected between an upper end of the front board and an upper end of the rear board. The upper connecting rod includes an upper connecting portion. The body includes a power converter electrically connected to an electricity output of the battery seat. The actuating device is electrically operable and includes a motor, a bobbin, and an auxiliary battery. The motor and the auxiliary battery are mounted on the frame. The power converter includes an output electrically connected to the motor. The auxiliary battery is electrically connected to the motor and supplies electricity to the motor when the electricity outputted by the power converter is insufficient. A rope is wound around the bobbin and includes an end coupled to the upper connecting portion of the upper connecting rod of the elevating seat. The bobbin is operatively connected to the motor. The motor is operable to rotate the bobbin and to move the rope.

In another example, the elevating seat includes an upper connecting rod interconnected between an upper end of the front board and an upper end of the rear board. The actuating device is manually operable and includes a bobbin. A rope is wound around the bobbin and includes an end coupled to an upper connecting portion of the upper connecting rod of the elevating seat. The bobbin is configured to be manually operated.

In an example, the battery seat includes a casing and an upper cover. The casing includes a bottom wall and a sidewall extending vertically from a periphery of the bottom wall. A compartment is defined between the bottom wall and the sidewall and receives the battery. The plurality of wheels is mounted to a bottom side of the bottom wall. The upper cover is configured to cover the casing and to close the compartment. A handle is mounted to the sidewall of the casing.

In an example, the lower positioning member is mounted to a lower end of the front board and includes a lower positioning button. The lower positioning portion is disposed on the sidewall of the casing of the battery seat and corresponds to the lower positioning button of the lower positioning member of the elevating seat. The lower positioning portion includes a positioning hole disengageably coupled with the lower positioning button of the lower positioning member.

The present invention will become clearer in light of the following detailed description of illustrative embodiments of this invention described in connection with the drawings.

DESCRIPTION OF THE DRAWINGS

FIG. 1 is a partial, exploded, perspective view of an electric vehicle including a battery mounting device of an embodiment according to the present invention.

FIGS. 1A, 1B, and 1C are enlarged views of three circled portions of FIG. 1, respectively.

FIGS. 2A, 2B, 2C, and 2D are enlarged views of four circled portions of FIG. 2, respectively.

FIG. 5A is an enlarged view of a circled portion of FIG. 5.

DETAILED DESCRIPTION OF THE INVENTION

Figure 2:
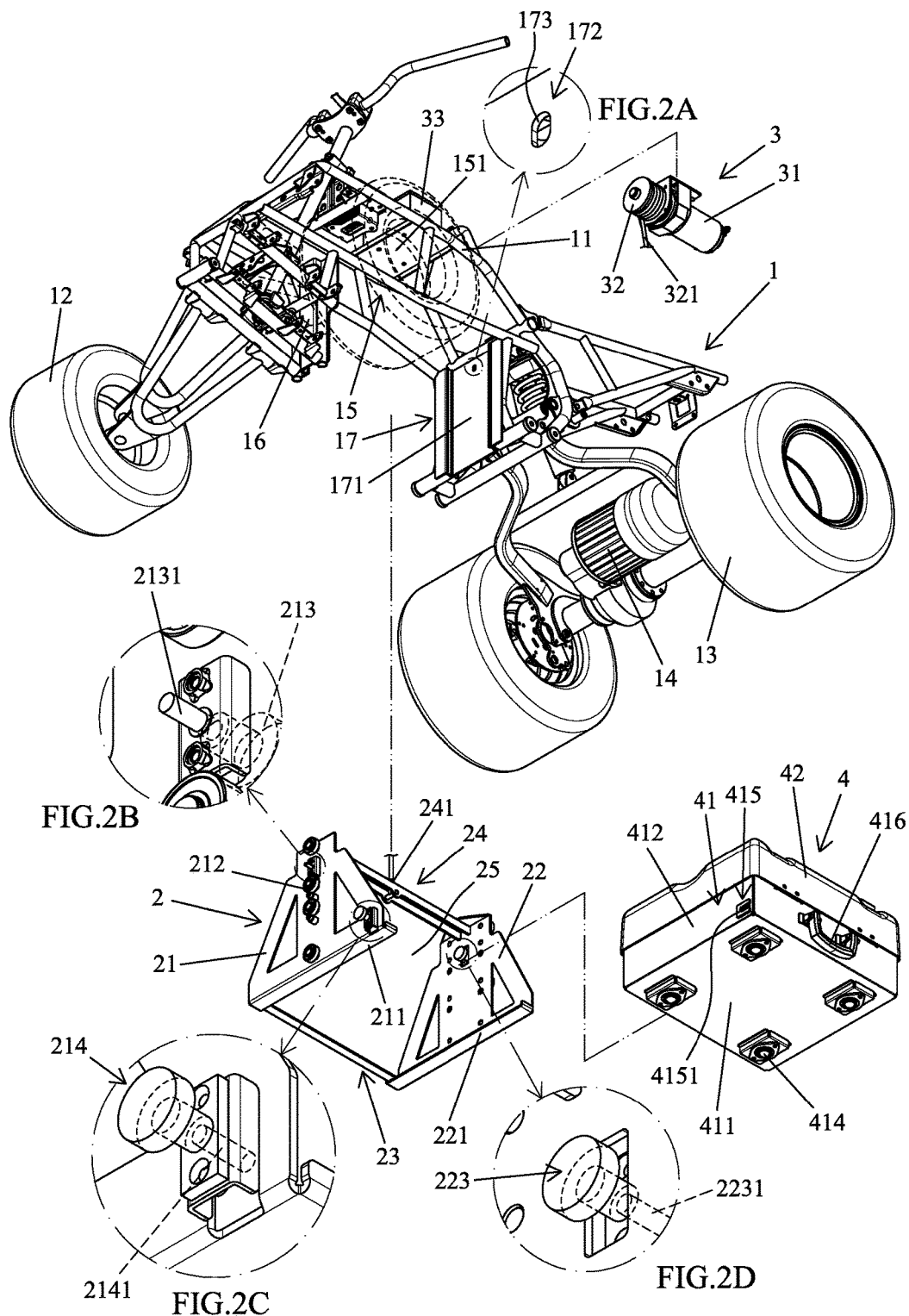
FIG. 2 is another partial, exploded, perspective view of the battery mounting device of FIG. 1.
Figure 3:
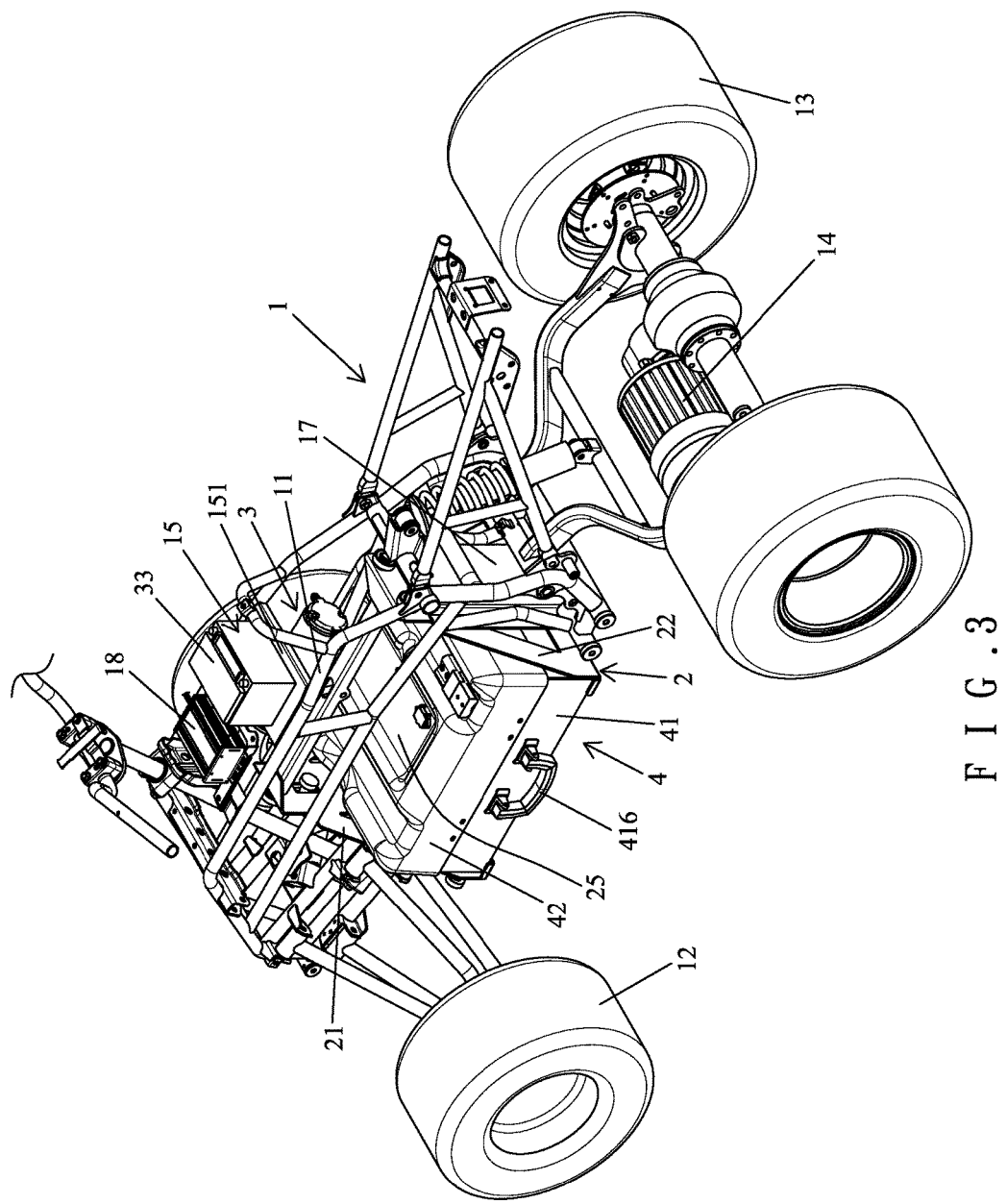
FIG. 3 is a partial, perspective view of the battery mounting device of FIG. 1 after assembly.

With reference to FIGS. 1-4, a battery mounting device according to the present invention includes a body 1, an elevating seat 2, an actuation device 3, and a battery seat 4. The body 1 can be of a type of an all terrain vehicle, an utility vehicle, or other vehicle. The body 1 includes a frame 11, two front wheels 12 mounted to a front end of the frame 11, and two rear wheels 13 mounted to a rear end of the frame 11. A power motor 14 is mounted to the rear end of the frame 11 to drive the rear wheels 13 to rotate. The frame 11 includes a connecting portion 15 having an upper connecting board 151 extending parallel to the ground. The connecting portion 15 further includes a front guiding board 16 at a front end thereof and a rear guiding board 17 at a rear end thereof. Each of the front guiding board 16 and the rear guiding board 17 extends in a vertical direction perpendicular to the ground. The front guiding board 16 includes a rear side having a front guiding groove 161 extending in the vertical direction. The front guiding board 16 further includes a front positioning portion 162 having a front positioning hole 163. The rear guiding board 17 includes a front side having a rear guiding groove 171 extending in the vertical direction. The rear guiding board 17 further includes a rear guiding portion 172 having a rear positioning hole 173.

The elevating seat 2 is mounted to the connecting portion 15 of the frame 11. The elevating seat 2 is movable in the vertical direction between a mounting position and a replacement position lower than the mounting position. The elevating seat 2 includes a front board 21 and a rear board 22 spaced from the front board 21 in a front/rear direction perpendicular to the vertical direction. Each of the front board 21 and the rear board 22 extends perpendicularly to the ground.

The elevating seat 2 further includes a side connecting rod 23 extending parallel to the ground and interconnected between a side of the front board 21 and a side of the rear board 22. The elevating seat 2 further includes an upper connecting rod 24 interconnected between the front board 21 and the rear board 22 and extending parallel to and above the side connecting rod 23. The front board 21, the rear board 22, the side connecting rod 23, and the upper connecting rod 24 together define a receiving space 25. The receiving portion 25 includes an opening 251 facing the side connecting rod 23. The front board 21 includes a front mounting board 211 extending from a lower end thereof towards the receiving space 25. The rear board 22 includes a rear mounting board 221 extending from a lower end thereof towards the receiving space 25. The side connecting rod 23 includes a side mounting board 231 extending from a lower end thereof towards the receiving space 25. The side connecting rod 23 includes a back board 232 extending vertically from the side mounting board 231.

A front guiding wheel 212 is mounted to a front side of the front board 21 and is movable in the front guiding groove 161. A rear guiding wheel 222 is mounted to a rear side of the rear board 22 and is movable in the rear guiding groove 171. The front board 21 includes a front positioning member 213 having a front positioning button 2131. The rear board 22 includes a rear positioning member 223 having a rear positioning button 2231. The front positioning button 2131 extends through the front positioning hole 163 and the rear positioning button 2231 extends through the rear positioning hole 173 to position the elevating seat 2 in the mounting position. Furthermore, the front positioning button 2131 and the rear positioning button 2231 can be disengaged from the front and rear positioning holes 163 and 173 to permit downward movement of the elevating seat 2. The upper lining rod 24 includes an upper connecting portion 241. A lower positioning member 214 is disposed on a lower end of the front board 21 and includes a lower positioning button 2141.

The actuating device 3 is mounted on the frame 11 and can be electrically or manually operated to move the elevating seat 2 in the vertical direction. The body 1 includes a power converter 18 electrically connected to an electricity output of the battery seat 4. In an example, the actuating device 3 is electrically operable and includes a motor 31, a bobbin 32, and an auxiliary battery 33. The motor 31 and the auxiliary battery 33 are mounted on upper and lower portions of the upper connecting board 151 of the frame 11. The power converter 18 includes an output electrically connected to the motor 13. The auxiliary battery 33 is electrically connected to the motor 31 and supplies electricity to the motor 31 when the electricity outputted by the power converter 18 is insufficient. A rope 321 is wound around the bobbin 32 and includes an end coupled to the upper connecting portion 241 of the upper connecting rod 24 of the elevating seat 2. The bobbin 32 is operatively connected to the motor 31. The motor 31 is operable to rotate the bobbin 32 and to move the rope 321.

In another example, the actuating device 3 is manually operable and includes a bobbin 32. A rope 321 is wound around the bobbin 32 and includes an end coupled to an upper connecting portion 241 of the upper connecting rod 24 of the elevating seat 2, and the bobbin 32 can be manually operated.

The battery seat 4 includes a casing 41, an upper cover 42, and a plurality of batteries 43. The casing 41 includes a bottom wall 411 and a sidewall 412 extending vertically from a periphery of the bottom wall 411. A compartment 413 is defined between the bottom wall 411 and the sidewall 412 and receives the batteries 43. The bottom side of the bottom wall 411 can be placed on the front mounting board 211, the rear mounting board 221, and the side mounting board 231. A plurality of wheels 414 is mounted to the bottom side of the bottom wall 411. The sidewall 412 includes a lower positioning portion 415 detachably coupled to the positioning button 2141 of the lower positioning member 214 of the elevating seat 2. The lower positioning portion 415 includes a lower positioning hole 4151. The sidewall 412 can abut the back board 232 of the elevating seat 2. A handle 416 is mounted to the sidewall 412 of the casing 41 and corresponds to the opening 251 of the elevating seat 2. The upper cover 42 is configured to cover the casing 41 and to close the compartment 413. Furthermore, the upper cover 42 can include a plurality of through-holes 421 through which wires (not shown) extend.

The lower positioning hole 4151 of the lower positioning portion 415 of the battery seat 4 is coupled with the lower positioning button 2141 of the lower positioning member 214 of the elevating seat 2. Thus, the elevating seat 2 is in the mounting position higher than the replacement position. Furthermore, the front and rear positioning buttons 2131 and 2231 of the front and rear positioning members 213 and 223 are respectively coupled with the front and rear positioning holes 163 and 173 of the front and rear positioning portions 162 and 172. Furthermore, the batteries 43 of the battery seat 4 can output electricity through the wires to the power motor 14 of the body 1. The battery seat 4 can be stably coupled to the elevating seat 2, and the elevating seat 2 can be stably coupled to the frame 11. Furthermore, the battery seat 4 is mounted to the central portion of the frame 11 to provide a better weight balancing while providing improved assembling reliability and driving stability. Thus, the battery seat 4 will not wobble and fall even if the vehicle is moving through a crooked uneven road surface.

Figure 4:
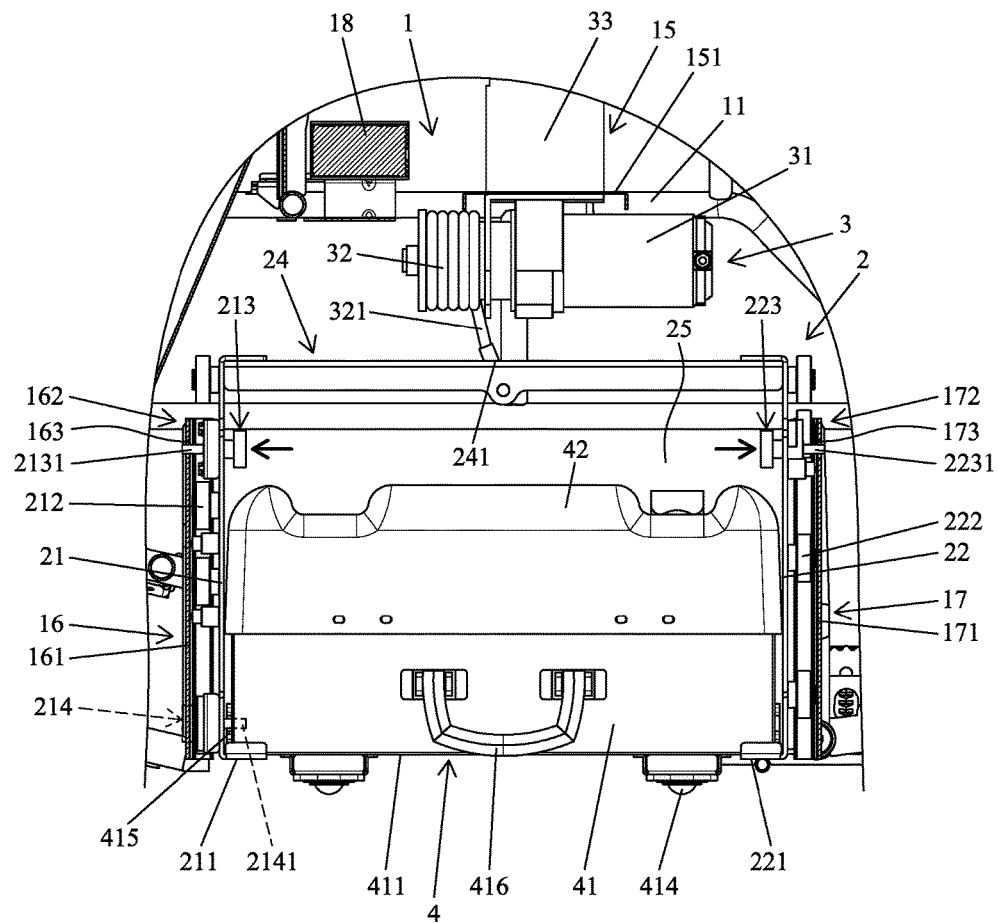
FIG. 4 is a partial, side view of the battery mounting device of FIG. 3.
Figure 5:
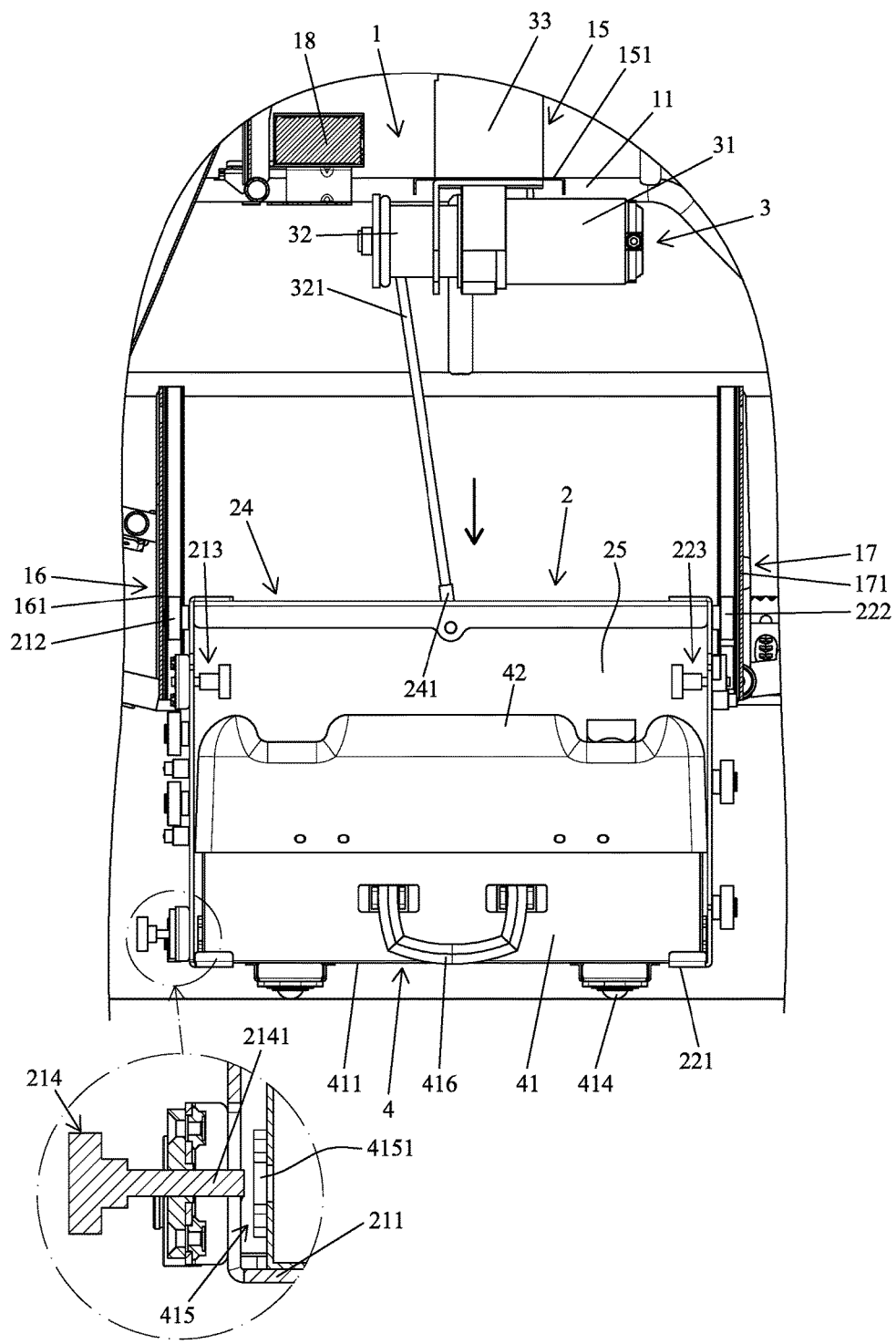
FIG. 5 is a view similar to FIG. 4 with an elevating seat moved to a lower position.
Figure 6:
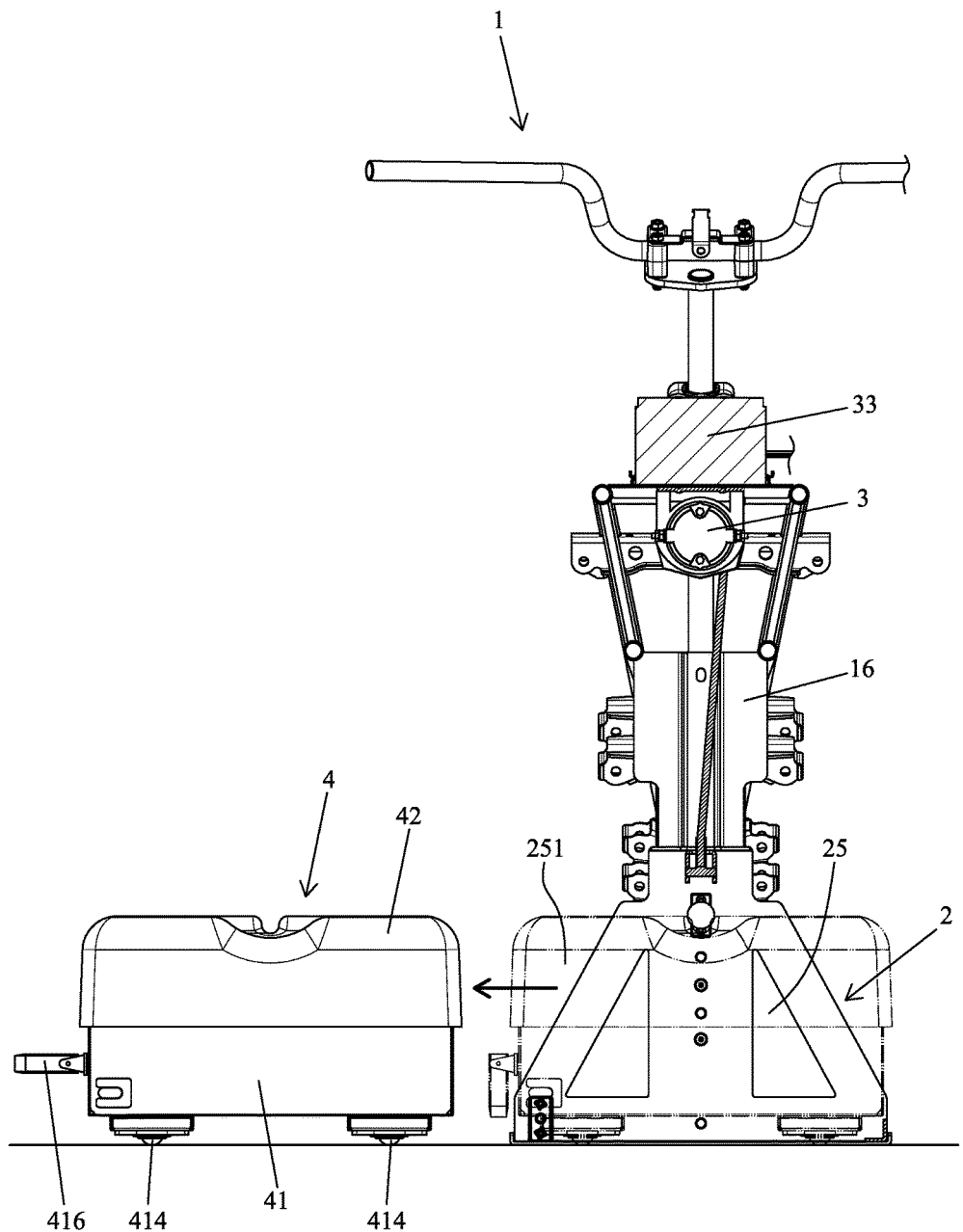
FIG. 6 is a diagrammatic view illustrating removal of a battery seat.

With reference to FIGS. 4-6, when the batteries 43 of the battery seat 4 have insufficient remaining electricity, the front and rear positioning buttons 2131 and 2231 of the front and rear positioning members 213 and 223 respectively disengage from the front and rear positioning holes 163 and 173 of the front and rear positioning portions 162 and 172. Furthermore, the motor 31 of the actuating device 3 operates to rotate the bobbin 32. The rope 321 is lowered and, thus, moves the elevating seat 2 downward until the wheels 414 of the battery seat 4 land on the ground. Furthermore, the lower positioning portion 415 of the battery seat 4 disengage from the positioning button 2141 of the lower positioning member 214 of the elevating seat 2. At this time, a user can grip the handle 416 to move the battery seat 4 out of the elevating seat 2 via the opening 251, and the upper cover 42 can be removed to permit replacement of the batteries 43, providing a force-saving effect. Furthermore, when the elevating seat 2 moves downward, the front and rear guiding wheels 212 and 222 respectively move in the front and rear guiding grooves 161 and 171, providing better movement stability.

After replacement of the batteries 43, the upper cover 42 is remounted to the battery seat 4 which is then placed into the receiving space 25 of the elevating seat 2 again. Then, the lower positioning member 214 is coupled with the lower positioning portion 415 of the battery seat 4. Next, the actuating device 3 is operated to move the rope 321, which, in turn, moves the elevating seat 2 upward to the mounting position. The front and rear positioning members 213 and 223 are respectively coupled with the front and rear positioning portions 162 and 172 to complete the replacement operation of the batteries 43, which is rapid and convenient.

In view of the foregoing, the battery mounting device according to the present invention provides convenient battery replacement and stable assembly. Furthermore, the actuating device 3 does not have to include the motor 31 and the batteries 43 when manually operated. In this case, the actuating device 3 can be manually operated to rotate the bobbin 32 to move the elevating seat 2 in the vertical direction.

Although specific embodiments have been illustrated and described, numerous modifications and variations are still possible without departing from the scope of the invention. The scope of the invention is limited by the accompanying claims.

The invention claimed is:

1. A battery mounting device for an electric all terrain vehicle or an electric utility vehicle, comprising:

a body including a frame having a connecting portion, wherein the connecting portion includes a front guiding board at a front end thereof and a rear guiding board at a rear end thereof, wherein each of the front guiding board and the rear guiding board extends in a vertical direction perpendicular to a ground, and wherein at least one of the front guiding board and the rear guiding board includes a positioning portion;

an elevating seat mounted to the connecting portion of the frame, wherein the elevating seat is movable in the vertical direction between a mounting position and a replacement position lower than the mounting position, wherein the elevating seat includes a front board and a rear board spaced from the front board, wherein each of the front board and the rear board extends perpendicularly to the ground, wherein each of the front board and the rear board is movable relative to the front and rear guiding boards in the vertical direction, wherein the elevating seat includes at least one positioning member disengageably coupled to the positioning portion, and wherein the elevating seat further includes a lower positioning member; and an actuation device mounted to the frame, wherein the actuation device is operable to move the elevating seat in the vertical direction; and a battery seat detachably mounted to the elevating seat, wherein the battery seat includes a battery and a compartment receiving the battery, wherein a plurality of wheels is mounted to a bottom side of the battery seat, wherein the battery seat further includes a lower positioning portion detachably coupled to the lower positioning member, wherein the lower positioning portion is coupled with the lower positioning member when the elevating seat is in the mounting position, and wherein when the elevating seat is in the replacement position, the battery seat is adapted to be placed on the ground, and the lower positioning portion is disengaged from the lower positioning member.

2. The battery mounting device for the all terrain vehicle or the utility vehicle as claimed in claim 1, wherein the connecting portion is located in a central portion of the frame, wherein the front guiding board includes a rear side having a front guiding groove extending in the vertical direction, wherein the rear guiding board includes a front side having a rear guiding groove extending in the vertical direction, wherein a front guiding wheel is mounted to a front side of the front board and is movable in the front guiding groove, and wherein a rear guiding wheel is mounted to a rear side of the rear board and is movable in the rear guiding groove.

3. The battery mounting device for the electric all terrain vehicle or the electric utility vehicle as claimed in claim 1, wherein the elevating seat includes a side connecting rod extending parallel to the ground and interconnected between a side of the front board and a side of the rear board, wherein the elevating seat further includes an upper connecting rod interconnected between the front board and the rear board and extending parallel to and above the side connecting rod, wherein the front board, the rear board, the side connecting rod, and the upper connecting rod together define a receiving space, wherein the receiving portion includes an opening facing the side connecting rod, wherein the front board includes a front mounting board extending from a lower end thereof towards the receiving space, wherein the rear board includes a rear mounting board extending from a lower end thereof towards the receiving space, wherein the side connecting rod includes a side mounting board extending from a lower end thereof towards the receiving space, and wherein the battery seat is supported by the front mounting board, the rear mounting board, and the side mounting board.

4. The battery mounting device for the electric all terrain vehicle or the electric utility vehicle as claimed in claim 3, wherein the side connecting rod includes a back board extending vertically from the side mounting board, and wherein the back board abuts the battery seat.

5. The battery mounting device for the electric all terrain vehicle or the electric utility vehicle as claimed in claim 1, wherein the front guiding board includes a front positioning portion having a front positioning hole, wherein the rear guiding board includes a rear guiding portion having a rear positioning hole, wherein the front board includes a front positioning member having a front positioning button, wherein the rear board includes a rear positioning member having a rear positioning button, wherein the front positioning button extends through the front positioning hole and the rear positioning button extends through the rear positioning hole to position the elevating seat in the mounting position.

6. The battery mounting device for the electric all terrain vehicle or the electric utility vehicle as claimed in claim 1, wherein the actuating device is electrically or manually operated to move the elevating seat in the vertical direction.

7. The battery mounting device for the electric all terrain vehicle or the electric utility vehicle as claimed in claim 6, wherein the elevating seat includes an upper connecting rod interconnected between an upper end of the front board and an upper end of the rear board, wherein the upper connecting rod includes an upper connecting portion, wherein the body includes a power converter electrically connected to an electricity output of the battery seat, wherein the actuating device is electrically operable and includes a motor, a bobbin, and an auxiliary battery, wherein the motor and the auxiliary battery are mounted on the frame, wherein the power converter includes an output electrically connected to the motor, wherein the auxiliary battery is electrically connected to the motor and supplies electricity to the motor when the electricity outputted by the power converter is insufficient, wherein a rope is wound around the bobbin and includes an end coupled to the upper connecting portion of the upper connecting rod of the elevating seat, wherein the bobbin is operatively connected to the motor, and wherein the motor is operable to rotate the bobbin and to move the rope.

8. The battery mounting device for the electric all terrain vehicle or the electric utility vehicle as claimed in claim 6, wherein the elevating seat includes an upper connecting rod interconnected between an upper end of the front board and an upper end of the rear board, wherein the actuating device is manually operable and includes a bobbin, wherein a rope is wound around the bobbin and includes an end coupled to an upper connecting portion of the upper connecting rod of the elevating seat, and wherein the bobbin is configured to be manually operated.

9. The battery mounting device for the electric all terrain vehicle or the electric utility vehicle as claimed in claim 1, wherein the battery seat includes a casing and an upper cover, wherein the casing includes a bottom wall and a sidewall extending vertically from a periphery of the bottom wall, wherein a compartment is defined between the bottom wall and the sidewall and receives the battery, wherein the plurality of wheels is mounted to a bottom side of the bottom wall, wherein the upper cover is configured to cover the casing and to close the compartment, and wherein a handle is mounted to the sidewall of the casing.

10. The battery mounting device for the electric all terrain vehicle or the electric utility vehicle as claimed in claim 9, wherein the lower positioning member is mounted to a lower end of the front board and includes a lower positioning button, wherein the lower positioning portion is disposed on the sidewall of the casing of the battery seat and corresponds to the lower positioning button of the lower positioning member of the elevating seat, and wherein the lower positioning portion includes a positioning hole disengageably coupled with the lower positioning button of the lower positioning member.

* * * * *